(12) United States Patent
Festa et al.

(10) Patent No.: US 6,620,321 B2
(45) Date of Patent: Sep. 16, 2003

(54) BIOFILTER SYSTEM AND METHOD FOR TREATING WASTEWATER

(76) Inventors: Edward R. Festa, 12455 Summerwood Dr., Ft. Myers, FL (US) 33908; Jeffrey A. Festa, 12455 Summerwood Dr., Ft. Myers, FL (US) 33908

( * ) Notice: Subject to any disclaimer, the term of this patent is extended or adjusted under 35 U.S.C. 154(b) by 0 days.

(21) Appl. No.: 10/023,513

(22) Filed: Dec. 18, 2001

(65) Prior Publication Data

US 2002/0134728 A1 Sep. 26, 2002

Related U.S. Application Data

(63) Continuation of application No. 09/475,397, filed on Dec. 30, 1999, now abandoned.

(51) Int. Cl.[7] .............................. C02F 3/00; B01D 35/00
(52) U.S. Cl. ....................... 210/602; 210/617; 210/150; 210/532.2
(58) Field of Search ................................ 210/602, 617, 210/150, 532.2

(56) References Cited

U.S. PATENT DOCUMENTS

| | | | | |
|---|---|---|---|---|
| 4,202,766 A | * | 5/1980 | Ono et al. ................... | 210/691 |
| 4,427,548 A | * | 1/1984 | Quick, Jr. ................... | 119/227 |
| 4,620,929 A | * | 11/1986 | Hofmann ..................... | 210/610 |
| 4,826,601 A | * | 5/1989 | Spratt et al. ................. | 210/610 |
| 4,915,842 A | * | 4/1990 | Kearney et al. ............. | 210/150 |
| 5,049,265 A | | 9/1991 | Boyd et al. | |
| 5,206,206 A | * | 4/1993 | Buelna et al. ............... | 502/401 |
| 5,413,618 A | * | 5/1995 | Penningsfeld et al. ......... | 44/490 |
| 5,578,114 A | | 11/1996 | Oude Luttighuis | |
| 5,618,414 A | * | 4/1997 | Goupil et al. ............... | 210/151 |
| 5,618,428 A | * | 4/1997 | Oslund ...................... | 119/246 |
| 5,820,762 A | * | 10/1998 | Bamer et al. ............... | 210/163 |
| 5,908,555 A | * | 6/1999 | Reinsel et al. .............. | 210/610 |
| 6,036,851 A | | 3/2000 | Simmering | |
| 6,063,268 A | * | 5/2000 | Jowett ........................ | 210/150 |
| 6,100,081 A | * | 8/2000 | Buelna ....................... | 210/150 |
| 6,136,749 A | * | 10/2000 | Gadkaree et al. ........... | 502/180 |
| 6,187,183 B1 | * | 2/2001 | Weaver et al. .............. | 210/150 |
| 6,217,760 B1 | * | 4/2001 | Bovington ............. | 137/118.01 |
| 6,296,775 B1 | * | 10/2001 | Moody et al. ........... | 210/532.2 |

OTHER PUBLICATIONS www.epa.gov/region/01/steward/ceitts/wastewater/techs/waterloo.html (Oct. 25, 2002) (discloses use in 1994–1997).
Premier Tech Environment Brochure—the Biofilter ST–650 (Jan. 1998) Viraraghavan, T. and Ayyaswami, A, *Use of Peat in Water Pollution Control: A Review*, 14: Can. J. civ. Eng. 230–233 (1987).
www.oclansorb.com/jungle.htm, ©1996, 1997 "Jungle Peat Moss For All Your Farming and Gardening Needs".

* cited by examiner

*Primary Examiner*—Chester T. Barry
(74) *Attorney, Agent, or Firm*—Hahn, Loeser & Parks LLP; Laura G. Barrow

(57) ABSTRACT

Improved biofilters for treating wastewater are disclosed. Specifically, certain aspects of the inventive biofilter comprise a water-tight, leak proof container housing a plurality of sacks stacked upon one another. Alternatively, the water-tight container may contain course sand for use as a re-circulating sand filtration unit. In the first embodiment, each sack contains a composition of filtering material through which the wastewater influent flows prior to removal from the biofilter via a pump tank. Other aspects of the present invention include a biofilter having a plurality of apertures disposed through the floor and through which the wastewater effluent may flow to the underlying ground. The invention is also directed to novel compositions of filtering material for use in the inventive biofilters as well as conventional biofilters. Preferred compositions comprise peat, coconut fibers, large or open cell film block pieces, and course sand.

19 Claims, 9 Drawing Sheets

BIOFILTER SYSTEM AND METHOD FOR TREATING WASTEWATER

This is a continuation application of Ser. No. 09/475,397, filed Dec. 30, 1999, now abandoned, and incorporated herein by reference in its entirety.

BACKGROUND OF INVENTION

The disadvantages of conventional waste water treatment systems is recognized in U.S. Pat. No. 5,618,414 to Goupil, et al. As described in Goupil, et al., conventional means for treating waste water collected in septic tank systems include treatment in a mechanically aerated treatment plant, which has high operational costs. Other waste water treatment systems in the art include soil and sand absorption systems. The disadvantages of these latter systems include the requirement of large surface areas of land. Moreover, conventional soil and sand absorption systems are not conducive in soils with high ground water tables or with low permeability characteristics.

The waste water treatment system described in Goupil et al. employs a pretreatment biofilter which collects wastewater from a septic system and removes metal and microbial contaminants from the effluent prior to dispersal to an absorption field. The biofilter in Goupil et al. also employs peat as the filtering media, peat having been long recognized in the waste water treatment art as being effective in removing pollutants and microbial activity. In Goupil, the peat is contained within two separate treatment chambers, and wastewater influent is distributed over the peat filtering media via a distribution plate. The embodiments taught in Goupil et al. are designed for use in an absorption field where the treated effluent is dispersed through the floor of the biofilter.

SUMMARY OF THE INVENTION

The present invention is directed to an improved biofilter that, in certain aspects, is especially conducive for use in drip irrigation applications wherein the biofilter comprises a water-tight container that prevents wastewater effluent from leaking out of the biofilter into the surrounding environment. In other aspects of the invention, the biofilter comprises an improved filtering composition comprising peat and coconut fibers that are contained within a plurality of sacks layered upon one another within the biofilter.

Specifically, the inventive biofilter comprises, in certain embodiments, (a) a container having an interior, an upper end, and a lower floor having a plurality of apertures through which wastewater effluent may flow; (b) a plurality of sacks housed within the interior of the container, wherein each of the sacks is formed of a porous material; and (c) a composition of filtering material contained within each of the sacks. Preferred compositions of filtering material include peat (preferably 80–85%), coconut fibers (preferably 10–20%), large cell, fixed film media blocks formed of, for example, rigid PVC (preferably up to 5%), and sand. The biofilter further includes a wastewater inlet disposed near the upper end of the container which is in communication with the interior of the container for receiving wastewater carried therein for treatment. The wastewater inlet is disposed such that the wastewater influent within the container flows downward via gravity through the sacks and exits the biofilter through the floor apertures. This embodiment is designed for subsurface installations where dispersal of the treated effluent into the underlying ground is desired.

The present invention is also directed to a biofilter design conducive for use in high water areas where effluent is disposed via drip irrigation or any absorption field. Specifically, the biofilter comprises a container having an interior, an upper end, side walls, and a solid, aperture-free lower floor integral with the side walls. This design results in a water-tight, leak-proof container which prevents contamination of the underlying ground with wastewater effluent. This embodiment of the inventive biofilter further includes a plurality of sacks housed within the interior of the container, wherein each of the sacks is formed of a porous material. Contained within each sack is a filtering composition preferably comprising peat, coconut fibers, large cell, fixed film media blocks (as described above), and sand. This embodiment further includes a wastewater inlet disposed near the upper end of the container which is in communication with the interior of the container for receiving wastewater influent carried into the container from a septic tank for treatment therein. The wastewater inlet is disposed such that the wastewater influent within the container flows downward via gravity through the sacks. Disposed near the lower floor is a wastewater outlet and a conduit connected to and extending from the container. The conduit is in communication with the wastewater outlet at one end and connected to, and extending from, a pump tank at another end of the conduit. The conduit is further configured to carry treated wastewater effluent from the container through the wastewater outlet via the pump for final discharge into the drip lines.

In both embodiments, the biofilter may include a layer of brick chips or lika rock on the floor for aiding in the removal of certain contaminants and nutrients as well as for providing added weight to the biofilter. Also, a second composition of filtering material is preferably placed within the interior of the container and disposed loosely therein to fill the interstitial spaces between the layered sacks. Preferably, this second composition of filtering material is the same as that contained within the sacks. The employment of individual sacks for housing the filtering composition is beneficial in terms of improved filtering efficiency, especially if the sacks are layered upon one another in opposite directions within the biofilter container. By utilizing individual sacks, the filtering material contained therein is more evenly dispersed, compared to a loose fill biofilter where voids may result within the biofilter such that some wastewater effluent may exit the biofilter untreated. Moreover, the employment of the individual sacks provides for improved maintenance, since it is easier to install and to remove individual sacks when replacing the interior of the biofilter as opposed to a loose fill of filtering material.

The present invention is also directed to a biofilter for treating wastewater wherein instead of using a peat-containing filtering media, course sand is employed. In this embodiment, the biofilter acts as a re-circulating sand filter. Specifically, the biofilter comprises a water-tight, leak-proof container having an interior, an upper end, side walls, and a solid, aperture-free lower floor integral with the side walls. Disposed within the interior is a sufficient amount of sand to fill at least 50%, and more preferably at least 90%, of the container's interior. The biofilter further comprises a wastewater inlet disposed near the upper end of the container that is in communication with the interior for receiving wastewater influent from a septic tank, the inlet being disposed such that the influent flows downward through the sand for treatment. A wastewater outlet is disposed near the lower floor of the container, and a conduit is connected to, and extends from, the container, the conduit being in communication with the outlet at one end and connected to a pump at another end. The pump removes the treated effluent from the biofilter.

The present invention provides an improved method of treating wastewater that is more efficient and provides for a cleaner effluent, thereby allowing the construction of larger buildings on smaller lots, wherein septic tanks are employed. The present invention is also more user-friendly in that it is smaller, easier to install than other types of biofilters, as well as easier to maintain than conventional biofilters.

DETAILED DESCRIPTION OF THE PREFERRED EMBODIMENTS

Figure 2:
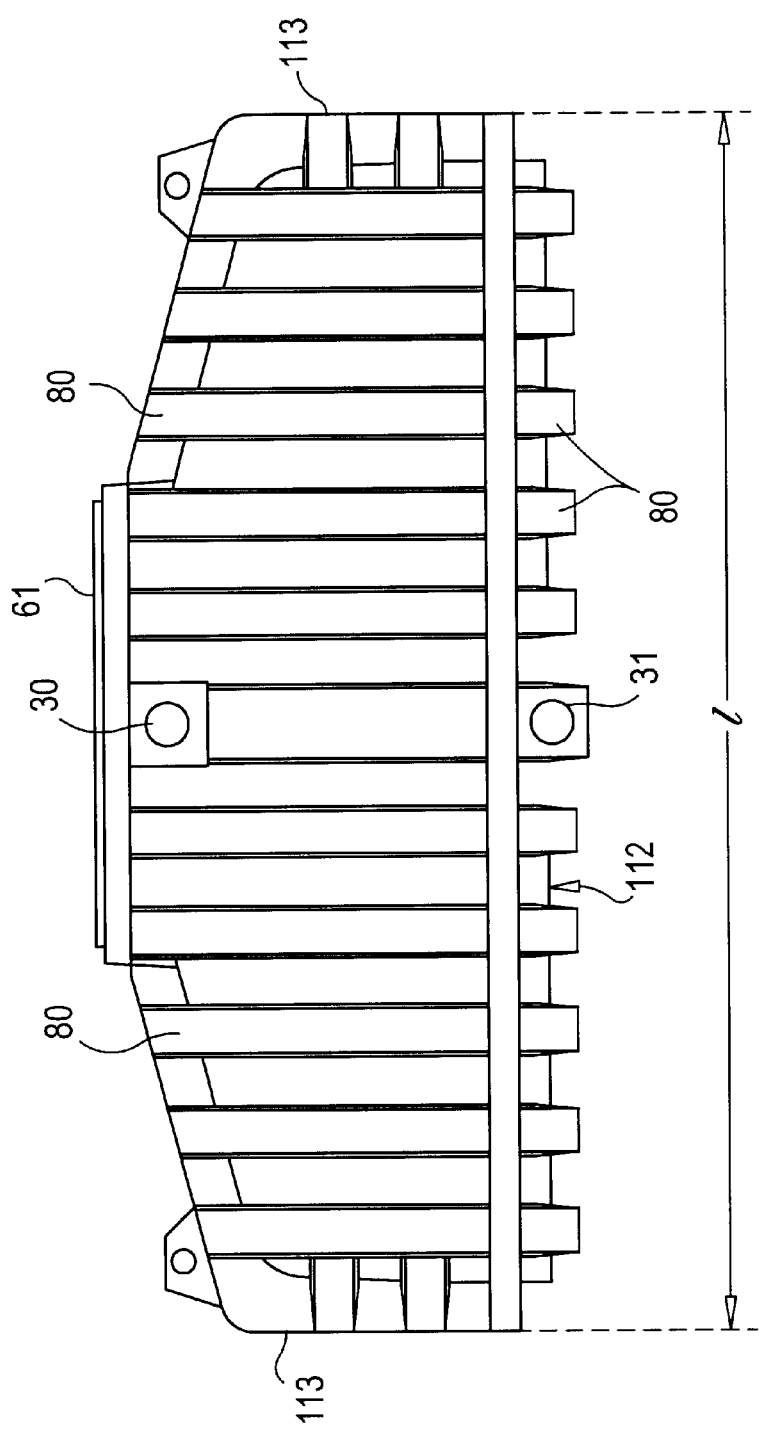
FIG. 2 is an interior sectional view of the inventive biofilter taken along lines 2—2 of FIG. 1c.
Figure 6:
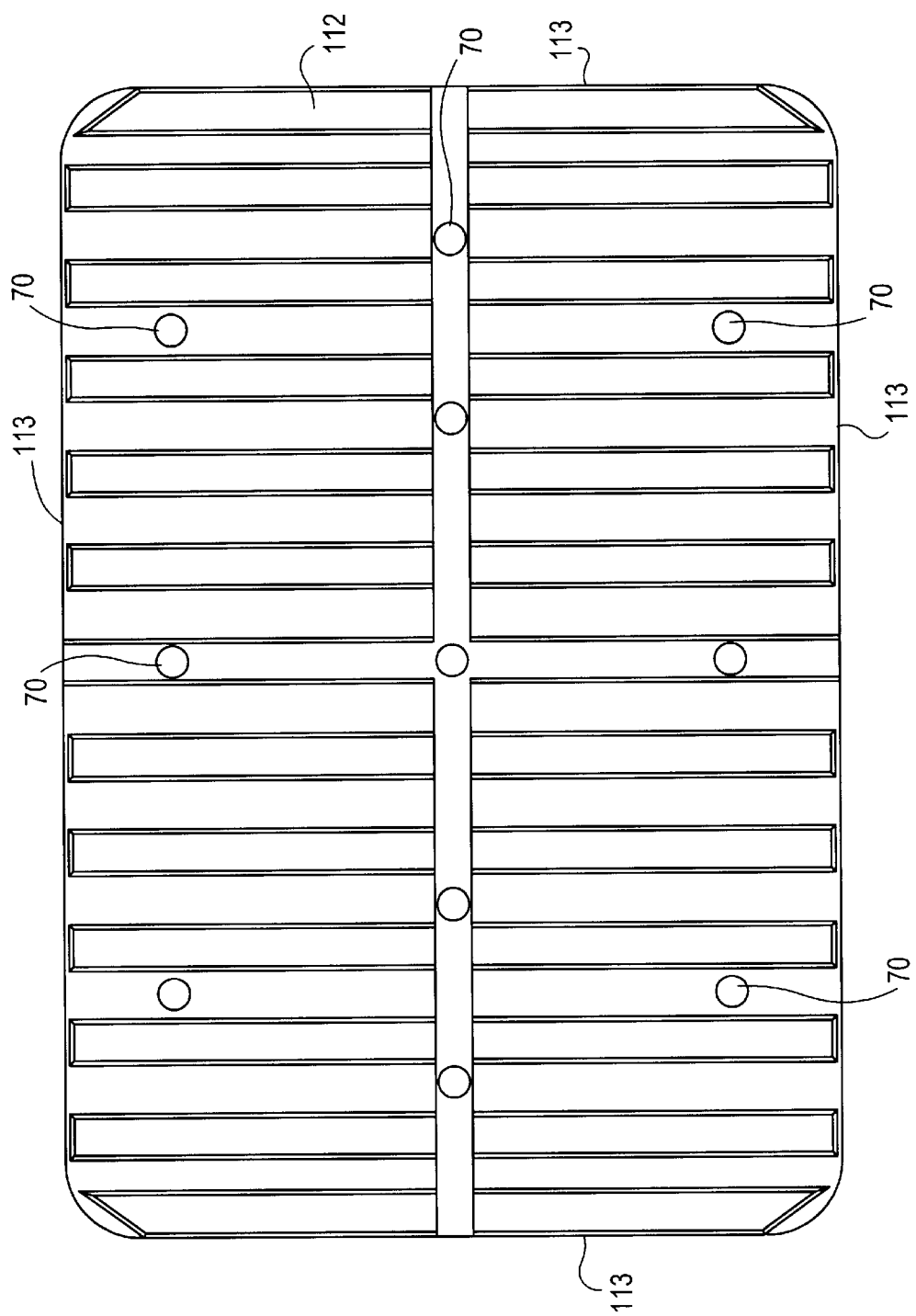
FIG. 6 is a perspective view of a sack used to contain the filtering media.

Referring now to the figures, the present invention is directed to a biofilter (10) comprising a container (11) having an interior (110), an upper end (111), side walls (113), and a lower floor (112). In the preferred embodiment for use in high water areas or areas described as high wet season water tables (see FIGS. 2–3), the container (11) has a solid, aperture-free floor (112) which is integral with the side walls (113), thereby resulting in a leak-proof, water-tight container (11). Housed within the interior (110) of the container (11) are a plurality of sacks (12) containing a composition of filtering material (13) (discussed in greater detail below). [Note that FIG. 2 illustrates the sacks schematically while FIG. 6 is a more accurate illustration of the sacks used in the preferred embodiments). The sacks (12) are fabricated of a porous or mesh-like material, such as polyethylene, for example, to allow wastewater influent to flow therethrough. "Porous material" as used herein shall mean any material, such as mesh, comprising pores of sufficient diameter to allow the wastewater influent to flow therethrough. Preferably, the holes (12a) within the sacks (12) are about ¼ inch in diameter for optimum flow. As shown in FIG. 6, the sack (12) has a closed end (12b) and an open end or mouth (12c) through which the filtering material is placed. A solid frame (15) may be used to keep the mouth (12c) of the sack wide open while filtering material is introduced therein. The sacks may be closed or sealed by any suitable means, such as tie strings, for example (not shown). Prior to use, a cap (60) is removed from the container (11), and the sacks (12) are placed within the container (11) through the top opening (61) and preferably layered in opposite directions. This preferred layering is shown schematically in FIG. 7, wherein the sacks of one layer (shown in phantom), for example, are aligned end (12b) to end (12c) in one direction (e.g. along the width (w) of the container) and sacks in the superjacent layer (shown in solid line) are arranged end (12b) to end (12c) along the length (l) of the container, thereby resulting in a criss-cross pattern of sacks. Stated another way, subjacent sacks are aligned perpendicular to one another. This arrangement (i.e. the placement of the filtering material (13) within individual porous sacks stacked upon one another) provides for a more uniform distribution of filtering material within the biofilter, and thus more uniform and efficient treatment of the wastewater effluent passing therethrough. The layering of the sacks in the criss-cross pattern also minimizes voids between subjacent sacks. In addition, a layer of brick chips, lika rock, or similar rocky aggregate, generally indicated as (14), may be placed upon the floor (112) to add weight to the biofilter. The brick chips (14), for example, also aid in removal of contaminants such as phosphorous, from the wastewater effluent. After the sacks (12) are placed within the container (11), additional filtering material (13a) is placed, and lightly compacted, on top of the sacks (11) and within the interstitial spaces between the sacks.

The interior (110) of the container is aerated via an air line (50) and the cap vent (62). Wastewater effluent from a septic tank is carried into the container (11) through a wastewater inlet (30) via a conduit (40). Preferably, the conduit (40) contains a series of holes (42) through which the influent may drip evenly onto the underlying sacks (12). Preferably, the holes (42) are about ⅝ inch in diameter. As wastewater influent flows through the sacks (12) via gravity, the resulting treated wastewater effluent is carried out of the container through an outlet (31) that may be located near the floor (112). A conduit (41) extending from the container (11) and in communication with the outlet (31) is further connected to a pump tank (T) for removing the treated effluent to a remote drip field, for example.

Preferably, the container (11) is formed of a durable polyethylene material. The outer sides of the container include ribs (80) for providing structural strength as well as anti-floatation properties. Such ribs are similar to the ribs found in conventional tanks. Preferred dimensions of the biofilter are 7 feet in width (w), 10 feet in length (l), and 4 feet in height (h) (without the cap (60)). The cap (60) is about 30×40 inches in size with a 6-inch rise for the cap (60) to fit over the opening (61) and the make the container (11) water-tight. The biofilter may be buried to within six inches of the cap (60). The container (11) may also employ a handle (91) that may be grasped by an installer during installation. While the foregoing dimensions are preferred, it will be appreciated by the those of ordinary skill in the art, having the benefit of the teachings of this invention and the prior art, that these dimensions may be altered as desired, depending in part on factors such as the capacity of the septic tank, for example.

For use in subsurface applications, the biofilter may be modified to include a plurality of apertures (70) in the floor (FIG. 4) through which the wastewater effluent passes to the underlying ground. The apertures (70) are preferably about 4 inches in diameter.

The present invention is also directed to an improved composition of filtering material for use in the inventive biofilters described herein as well as in other types of biofilters employing peat compositions. A preferred composition of filtering material (13) comprises peat moss (preferably about 80% to 85%) and coconut fibers (preferably about 10% to 20% coconut fibers). More preferably, small solid pieces or blocks of large cell, fixed film media are mixed with the peat and coconut fibers for the purpose of adding more surface area upon which beneficial microbial organisms can grow and subsequently digest the wastewater solids into a cleaner liquid. Preferably, the pieces of fixed film media comprise at least 5% of the filtering composition. It will be understood by those of ordinary skill in the art that there are many types of solid media that can provide this function, that is, to provide an increased surface area to sustain and encourage growth of these microbes. However, a preferred material is a structured media of rigid PVC vended by L.S. Enterprises (Ft. Myers, Fla.) as CF-650, CF-1200, CF-1900, CF-3000, IF-6000, and VF19PLUS). Table 1 lists the preferred media types vended by L.S. Enterprises. Finally, the dimensions of the pieces or blocks of fixed film media are about 2 cubic inches.

The preferred peat in the inventive composition is a specially harvested sphagnum with a moisture content of 40% to 50% [e.g. Worcester Peat from Debbuis, Me.]. The components of the filtering material are mixed slowly in a slow tumble process and then placed in the sacks (12). The coconut fibers in combination with the solid fixed film media blocks provide more surface area for bacterial and fungal growth, thereby producing a cleaner effluent. Alternatively, course sand may be added to the above-described compositions. The provision of sand to the peat-coconut fiber-fixed film media composition not only adds more surface area for the growth of beneficial bacteria, but aids in preventing the filtering material from clogging during use, thereby improving the flow of wastewater effluent therethrough.

As discussed above, the inventive biofilter may be connected to a pump tank (T) for disposal of the treated wastewater effluent to a distant drip irrigation field. The biofilter should not, however, be placed in an area prone to flooding. In this application, the biofilter container (11) is completely water-tight to prevent leakage of any wastewater effluent to the underlying ground. When installing this embodiment, about a one-foot layer of stone or brick chips (14) should be placed on the floor (112) of the container (11). Next, the sacks (12) are layered on top of one another within the container (11), as described above, followed by the addition of loose filtering material (13a) to fill the interstitial spaces between the sacks (12). A six-inch layer (13b) of loose filtering material is placed and lightly compacted on top of the last layer of sacks (12). Preferably, this six-inch layer of filtering material includes a top layer of coconut fibers to aid in the treatment process and deflect the incoming wastewater stream.

Figure 4:
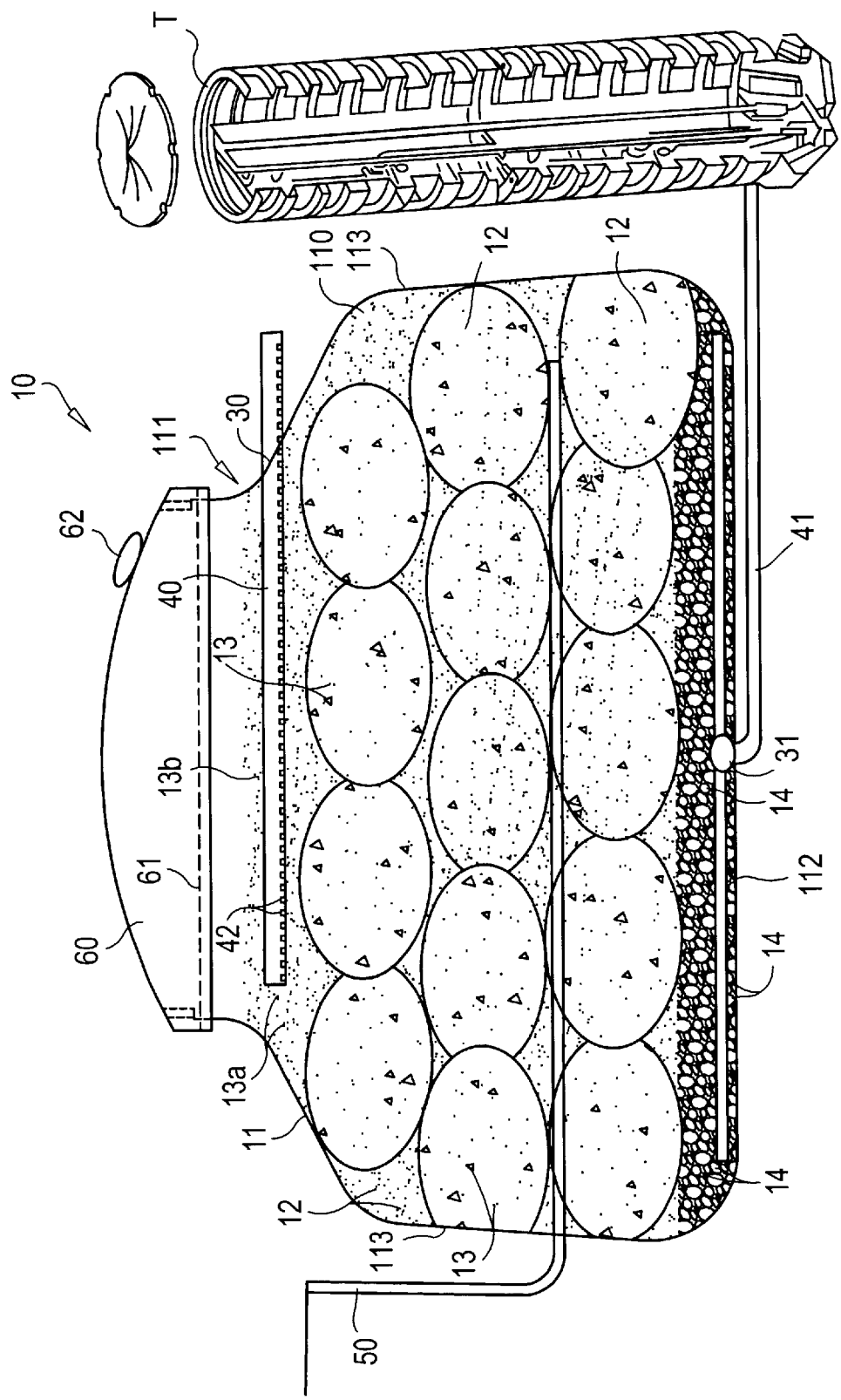
FIG. 4 is a bottom view of a second embodiment of the biofilter.

Alternatively, the biofilter may be modified by providing apertures (70) within the floor (112) of the container (11) for subsurface or mound applications (FIG. 4). Here, the effluent flows downward through the container (11) to the underlying ground. It is important that for optimal results in subsurface and mound applications, the biofilter not be installed in bedrock, clay, or poor soils. In this embodiment, a six-inch layer (14) of stone or brick chips is placed on the floor (112) of the container (11), followed by placement of the sacks (12) and loose filtering material (13a, 13b) thereon as described above for the water-tight embodiment used in drip field applications.

Figure 8:
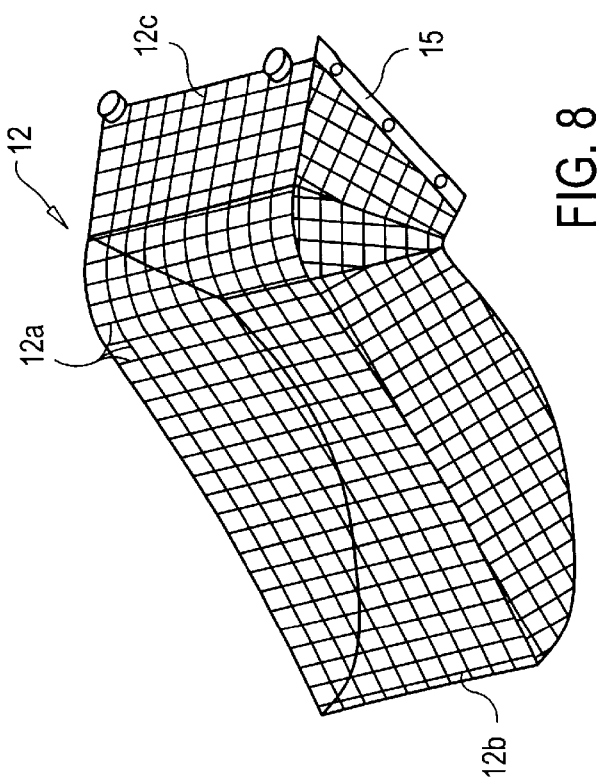
FIG. 8 is a side, interior view of the third embodiment of the biofilter.

FIG. 8 is a schematic interior view of a third embodiment of the biofilter that may be used as a re-circulating sand filter in areas where the employment of a peat-containing filtering media is not desired. Specifically, the biofilter employs a water-tight, leak-proof container (11) that is identical to the biofilter illustrated in FIGS. 1a–1c, and 3, including the aperture-free floor (112), waste-water inlets (30), and wastewater outlets (31). The biofilter may also employ a conduit (41) as shown in FIG. 2, the conduit being in communication with the outlet (31) and a separate pump for disposal of the treated wastewater to a distant irrigation field. Also, a layer of brick chips, lika rock, or similar rocky aggregate (14) should be placed upon the floor (112) to add weight to the biofilter and aid in removal of contaminants such as phosphorous, from the wastewater effluent, as discussed above for the other embodiments. The container (11) is then filled with course sand (92). Preferably, a sufficient amount of sand is placed within the container to fill at least 50%, and more preferably at least 90%, of the interior volume of the biofilter container.

Figure 5:
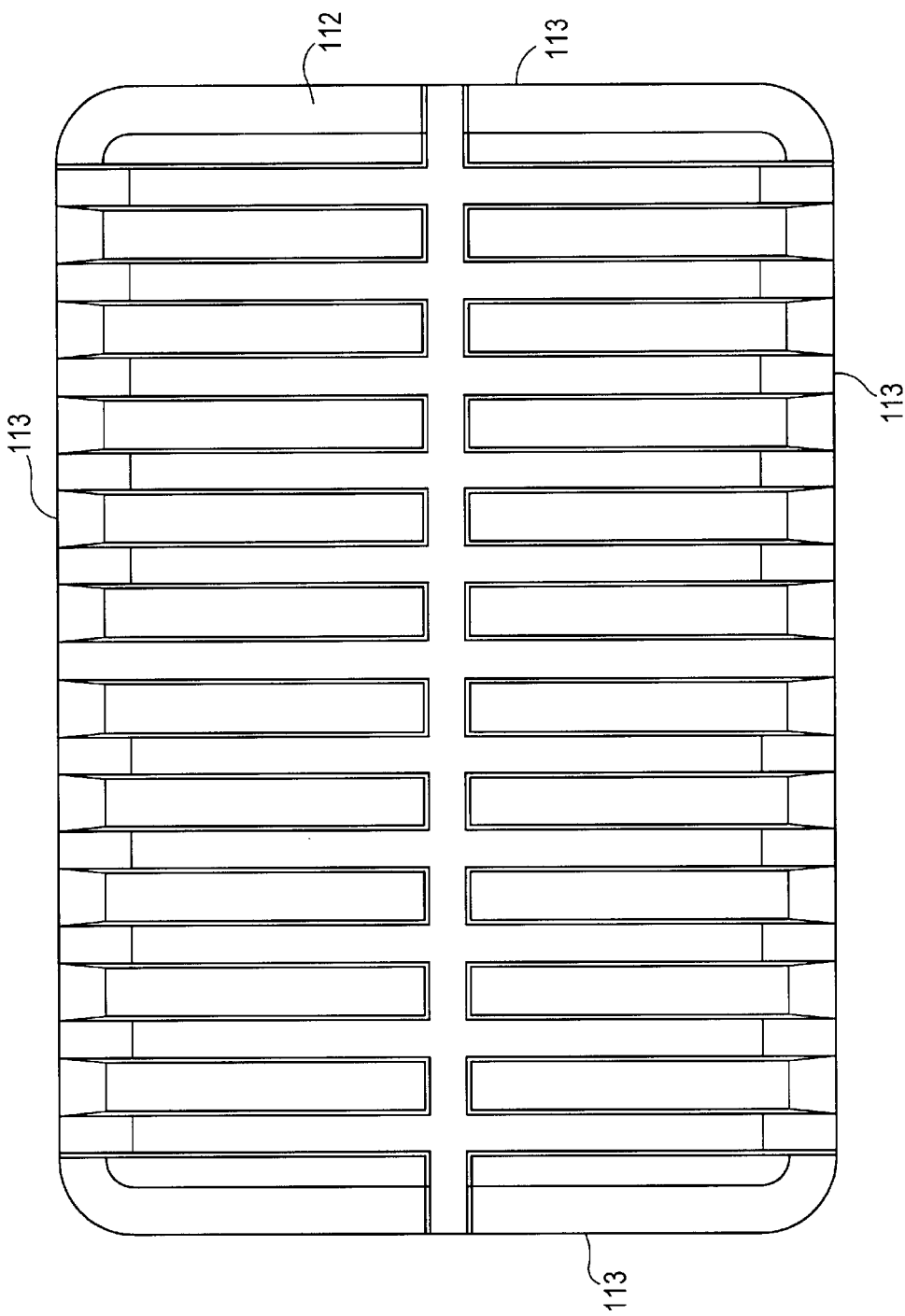
FIG. 5 is a schematic view of the use of multiple biofilters.

FIG. 5 is a schematic of the employment of multiple biofilters of the present invention. Any of the types of biofilter units described herein may be used where multiple units are desired for drip irrigation, sub-surface, or mound applications. A flow divider valve (90) must be employed to provide for equal distribution of influent to each biofilter.

The present invention provides for an improved wastewater system capable of removing 99% of fecal coliforms as measured in mg/l. The biofilters reduce biological oxygen demand (BOD) to less than 10 mg/l, reduces suspended solids to less than 7 mg/l, and removes heavy metals, such as lead and mercury, by ion exchange.

TABLE 1

| Media Type* | Sheet Spacing | Surface Area | Sheets/ft | Sheet Gauge |
| --- | --- | --- | --- | --- |
| CF-650 | 6.9 mm | 119 ft$^2$/ft$^3$ | 44 | 8 mil |
|  |  | 390 m$^2$/m$^3$ |  | 0.20 mm |
| CF-1200 | 12 mm | 69 ft$^2$/ft$^3$ | 26 | 8, 10, 15 mil |
|  |  | 226 m$^2$/m$^3$ |  | 0.2, 0.25, 0.38 mm |
| CF-1900 | 19 mm | 48 ft$^2$/ft$^3$ | 16 | 10, 15 mil |
|  |  | 157 m$^2$/m$^3$ |  | 0.25, 0.38 mm |
| CF-3000 | 30 mm | 31 ft$^2$/ft$^3$ | 10 | 15, 20 mil |
|  |  | 102 m$^2$/m$^3$ |  | 0.38, 0.5 mm |

*CF-650 is a very dense packing used in clean water applications such as aquariums, bait holding systems, or laboratory settings.
CF-1200 is a dense media used often in food fish production systems.
CF-1900 is an open media used where suspended solids is a problem-is good resistance to plugging when used for ammonia control-is preferred in the present invention.
CF-3000 is a very open media used in applications where severe plugging is expected-is commonly used in industrial and domestic sewage treatment plants with very heavy nutrient loadings.

What is claimed:

1. A biofilter for treating waste water, said biofilter comprising:
   (a) a container having an interior, an upper end, and a lower floor, said floor having a plurality of apertures through which wastewater effluent may flow;
   (b) a plurality of sacks housed within said interior of said container, each of said sacks formed of a porous material, and wherein said plurality of sacks are arranged within said container in layers, wherein sacks in a first layer are arranged end to end to one another and sacks in a second layer superjacent to said first layer of sacks are arranged end to end to one another such that sacks of said second layer are oriented perpendicular to subjacent sacks of said first layer, thereby forming a criss-cross pattern with respect to said layers of sacks;
   (c) a composition of filtering material contained within each of said plurality of sacks; and
   (d) a wastewater inlet disposed near the upper end of the container and in communication with said interior for receiving wastewater influent carried into said interior for treatment therein, said inlet connected to a conduit housed within said interior of said container, said conduit having a series of holes through which said wastewater influent flows downward onto and through said sacks and exits said biofilter container through said floor apertures.

2. The biofilter of claim 1, wherein said composition of filtering material comprises peat moss and coconut fibers.

3. The biofilter of claim 1, further including a layer of solid chips positioned along the floor of said biofilter, wherein said solid chips are formed of a material selected from the group consisting of bricks and rocks.

4. The biofilter of claim 1, further including a second composition of filtering material disposed within interstitial spaces between said sacks.

5. The biofilter of claim 4, further including a layer of solid chips positioned along the floor of said biofilter, wherein said solid chips are formed of a material selected from the group consisting of brick and rock.

6. A biofilter for treating waste water, said biofilter comprising:
   (a) a container having an interior, an upper end, side walls, and a solid, aperture-free lower floor integral with said side walls;
   (b) a plurality of sacks housed within said interior of said container, each of said sacks formed of a porous material wherein said plurality of sacks are arranged within said container in layers, wherein sacks in a first layer are arranged end to end to one another and sacks in a second layer superjacent to said first layer of sacks are arranged end to end to one another such that sacks of said second layer are oriented perpendicular to subjacent sacks of said first layer, thereby forming a criss-cross pattern with respect to said layers of sacks;
   (c) a composition of filtering material contained within each of said plurality of sacks;
   (d) a wastewater inlet disposed near the upper end of the container and in communication with said interior for receiving wastewater influent carried into said for treatment therein, said inlet connected to a conduit housed within said interior of said container, said conduit having a series of holes through which said wastewater influent flows downward onto and through said sacks;
   (e) a wastewater outlet disposed near the lower floor of said container; and
   (f) a conduit connected to and extending from said container, wherein said conduit is in communication with said wastewater outlet at one end and connected to a pump at another end of said conduit, said conduit further configured to carry treated wastewater effluent from said container through said wastewater outlet via said pump.

7. The biofilter of claim 6, wherein said composition of filtering material comprises peat moss and coconut fibers.

8. The biofilter of claim 6, further including a layer of solid chips positioned along the floor of said biofilter, wherein said solid chips are formed of a material selected from the group consisting of brick and rocks.

9. The biofilter of claim 6, further including a second composition of filtering material disposed within interstitial spaces between said sacks.

10. A biofilter for treating waste water, said biofilter comprising:
    (a) a water-tight, leak proof container having an interior, an upper end, side walls, and a solid, aperture-free lower floor integral with said side walls;
    (b) a wastewater inlet disposed near the upper end of the container and in communication with said interior for receiving wastewater influent carried into said interior for treatment therein, said inlet disposed such that said wastewater influent within said container flows downward through said interior;
    (c) a sufficient amount of sand disposed within said interior of said container to fill at least 50% of said interior;
    (d) a wastewater outlet disposed near the lower floor of said container; and
    (e) a conduit connected to and extending from said container, wherein said conduit is in communication with said wastewater outlet at one end and connected to a pump at another end of said conduit, said conduit further configured to carry treated wastewater effluent from said container through said wastewater outlet via said pump.

11. The biofilter of claim 10, wherein said sand comprises at least 90% of said interior.

12. A method for treating wastewater, said method comprising:
    (a) introducing wastewater from a septic tank into a biofilter, said biofilter comprising:
        (i) a container having an interior, an upper end, side walls, and a solid, aperture-free lower floor integral with said side walls;
        a plurality of sacks housed within said interior of said container, each of said sacks formed of a porous material;
        (ii) a composition of filtering material contained within each of said plurality of sacks;
        (iii) said plurality of sacks are arranged within said container in layers, wherein sacks in a first layer are arranged end to end to one another and sacks in a second layer superjacent to said first layer of sacks are arranged end to end to one another such that sacks of said second layer are oriented perpendicular to subjacent sacks of said first layer, thereby forming a criss-cross pattern with respect to said layers of sacks;
        (iv) a wastewater inlet disposed near the upper end of said container and in communication with said interior for receiving wastewater influent carried into said interior for treatment therein, said inlet disposed such that said wastewater influent within said container flows downward through said sacks;
        (v) a wastewater outlet disposed near the lower floor of said container; and
        (vi) a conduit connected to and extending from said container, wherein said conduit is in communication with said wastewater outlet at one end and connected to a pump at another end of said conduit, said conduit further configured to carry treated wastewater effluent from said container through said wastewater outlet via said pump; and
    (b) removing said treated wastewater effluent from said biofilter via said pump to a distant drip irrigation field.

13. The method of claim 12, wherein said composition of filtering material comprises peat moss and coconut fibers.

14. The method of claim 13, wherein said composition comprises from 80% to 85% of peat moss and about 10% coconut fiber.

15. The method of claim 13, further including solid pieces of fixed film media.

16. A method for treating wastewater, said method comprising:
    (a) introducing wastewater from a septic tank into a biofilter for treatment, said biofilter further comprising:
        (i) a water-tight, leak-proof container having an interior, an upper end, side walls, and a solid, aperture-free lower floor integral with said side walls;

(ii) a sufficient amount of sand disposed within said interior of said container to fill at least 50% of said interior;

(iii) a wastewater inlet disposed near the upper end of the container and in communication with said interior for receiving wastewater influent carried into said container for treatment therein, said inlet disposed such that said wastewater influent within said container flows downward through said sand;

(iv) a wastewater outlet disposed near the lower floor of said container; and (v) a conduit connected to and extending from said container, wherein said conduit is in communication with said wastewater outlet at one end and connected to a pump at another end of said conduit, said conduit further configured to carry treated wastewater effluent from said container through said wastewater outlet via said pump; and (b) removing treated wastewater effluent from said biofilter via a pump through said conduit.

17. The method of claim 16, wherein sand comprises at least 90% of said interior.

18. A biofilter for treating wastewater, said biofilter comprising:

(a) a container having an interior, an upper end, and a lower floor, said floor having a plurality of apertures through which wastewater effluent may flow;

(b) a plurality of sacks housed within said interior of said container, each of said sacks formed of a porous material;

(c) a composition of filtering material contained within each of said plurality of sacks;

(d) a layer of solid chips positioned along the floor of said biofilter, wherein said solid chips are formed of a material selected from the group consisting of bricks and rocks; and (e) a wastewater inlet disposed near the upper end of the container and in communication with said interior for receiving wastewater influent carried into said interior for treatment therein, said inlet disposed such that said wastewater influent within said container flows downward through said sacks and exits said biofilter through said floor apertures.

19. A biofilter for treating wastewater, said biofilter comprising:

(a) a container having an interior, an upper end, and a lower floor, said floor having a plurality of apertures through which wastewater effluent may flow;

(b) a plurality of sacks housed within said interior of said container, each of said sacks formed of a porous material;

(c) a composition of filtering material contained within each of said plurality of sacks;

(d) a second composition of filtering material disposed within interstitial spaces present between said sacks; and (e) a wastewater inlet disposed near the upper end of the container and in communication with said interior for receiving wastewater influent carried into said interior for treatment therein, said inlet connected to a conduit housed within said interior of said container, said conduit having a series of holes through which said wastewater influent flows downward onto and through said sacks and exits said biofilter container trough said floor apertures.

* * * * *

UNITED STATES PATENT AND TRADEMARK OFFICE
CERTIFICATE OF CORRECTION

Figure 1:
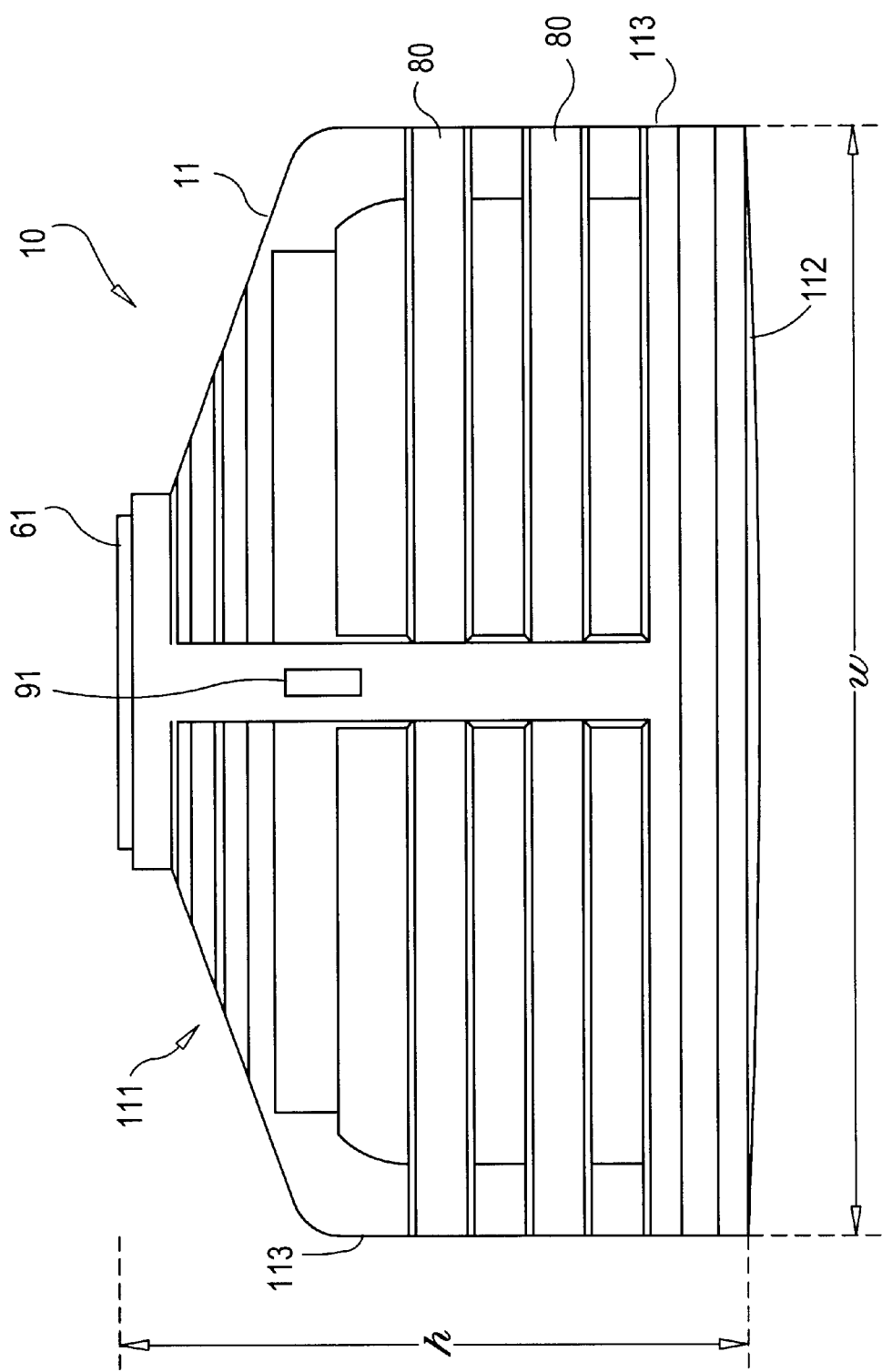
FIG. 1a is an end view of the inventive biofilter.
FIG. 1b is a side view of the inventive biofilter.
FIG. 1c is a top view of the inventive biofilter
Figure 3:
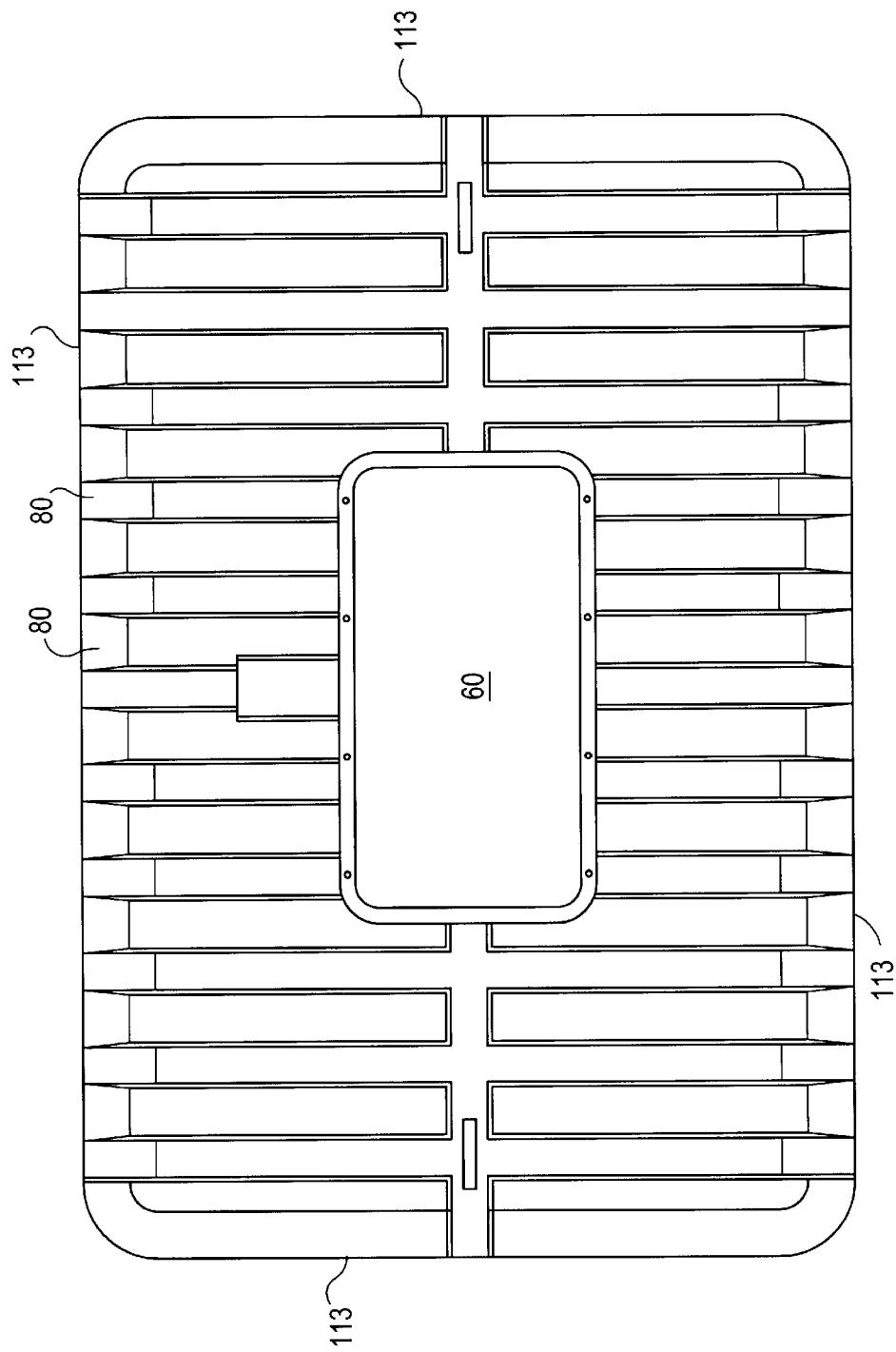
FIG. 3 is a bottom view of one embodiment of the biofilter.
Figure 7:
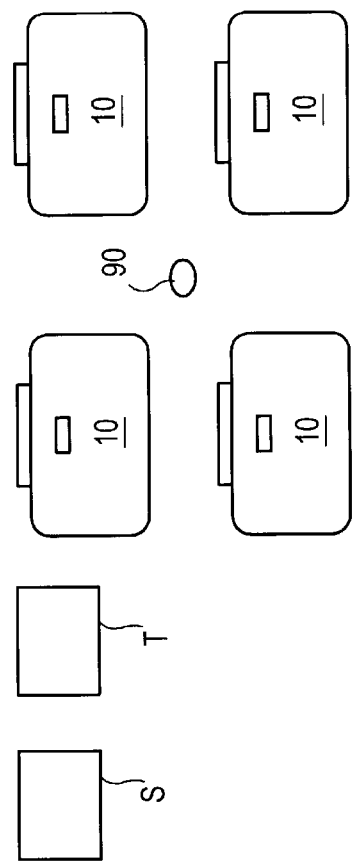
FIG. 7 is a schematic representation of the layering of the sacks within the first two embodiments of the biofilter.
Figure 9:
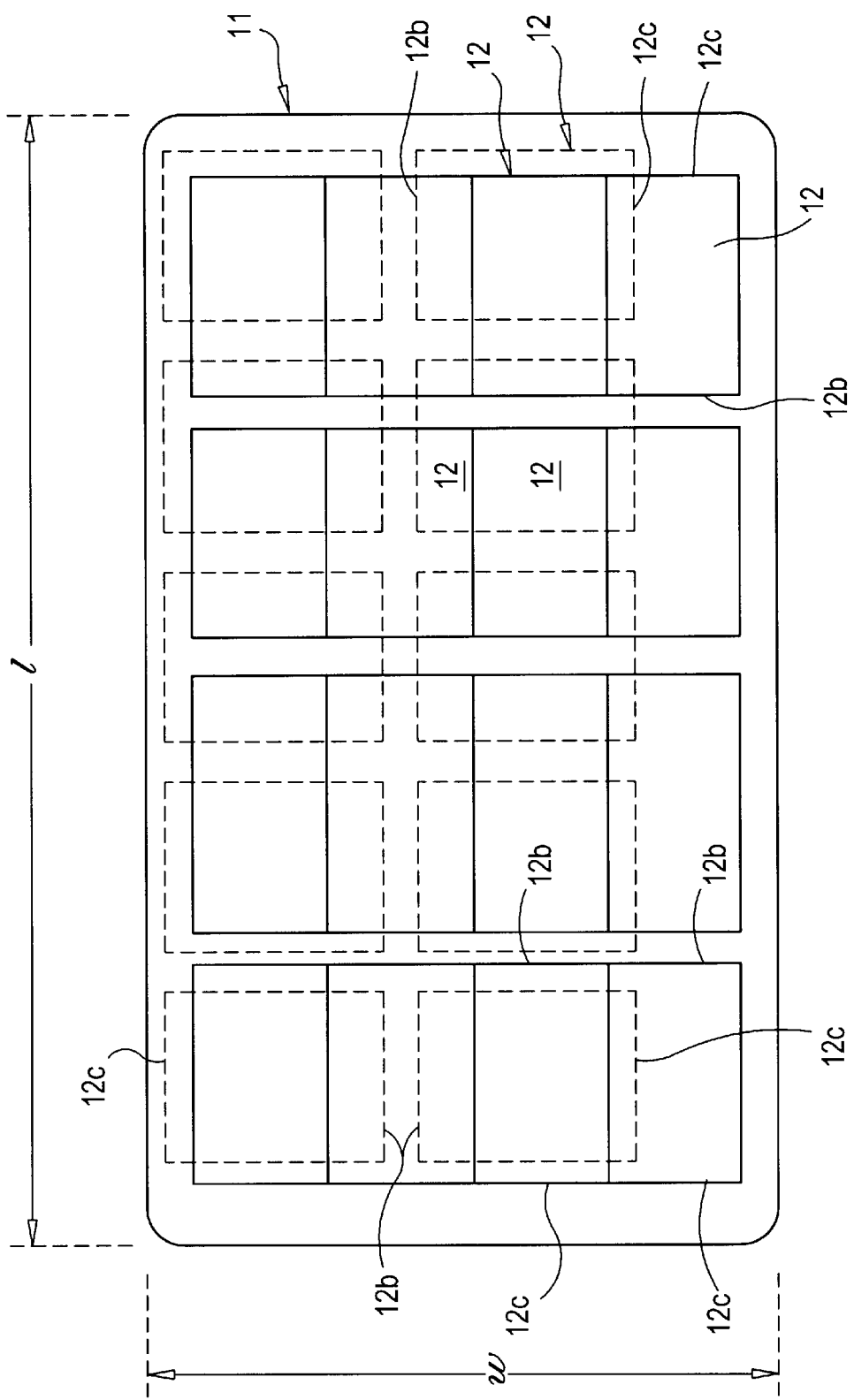
Figure 10:
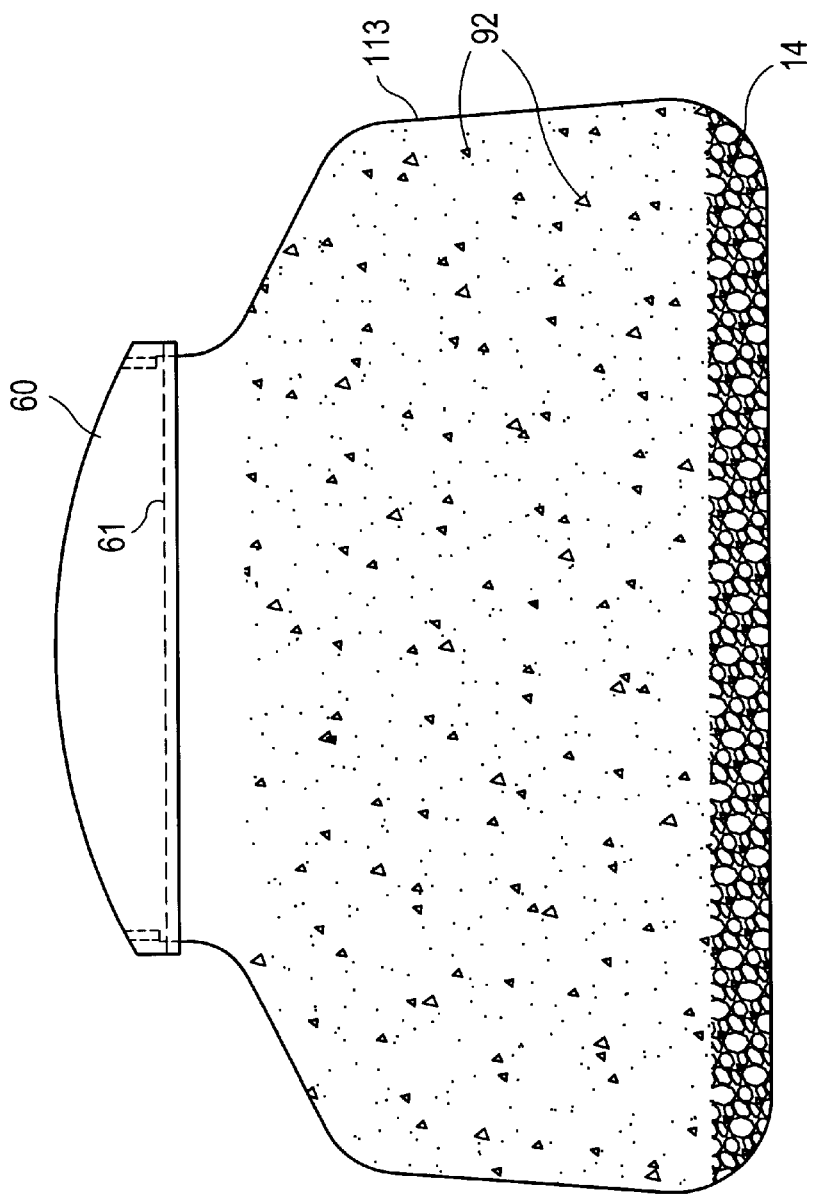

PATENT NO. : 6,620,321 B2
APPLICATION NO. : 10/023513
DATED : September 16, 2003
INVENTOR(S) : Edward R. Festa and Jeffrey A. Festa It is certified that error appears in the above-identified patent and that said Letters Patent is hereby corrected as shown below:

The following changes are made in the drawings:

On sheet 1, FIG. 1, change "FIG. 1" to -- FIG. 1a --
On sheet 2, FIG. 2, change "FIG. 2" to -- FIG. 1b --
On sheet 3, FIG. 3, change "FIG. 3" to -- FIG. 1c --
On sheet 4, FIG. 4, change "FIG. 4" to -- FIG. 2 --
On sheet 5, FIG. 5, change "FIG. 5" to -- FIG. 3 --
On sheet 6, FIG. 6, change "FIG. 6" to -- FIG. 4 --
On sheet 7, FIG. 7, change "FIG. 7" to -- FIG. 5 -- and
    delete reference "S" and reference "T"
On sheet 7, FIG. 8, change "FIG. 8" to -- FIG. 6 --
On sheet 8, FIG. 9, change "FIG. 9" to -- FIG. 7 --
On sheet 9, FIG. 10, change "FIG. 10" to -- FIG. 8 --

Signed and Sealed this

Thirty-first Day of March, 2009

JOHN DOLL
*Acting Director of the United States Patent and Trademark Office*